(12) United States Patent
Mizoguchi et al.

(10) Patent No.: US 7,221,651 B2
(45) Date of Patent: May 22, 2007

(54) RADIO STATION AND DATA PACKET TRANSMITTING/RECEIVING METHOD

(75) Inventors: Yasuhiko Mizoguchi, Tokyo (JP); Kenichi Urayama, Kanagawa (JP)

(73) Assignee: Sony Corporation (JP)

( * ) Notice: Subject to any disclaimer, the term of this patent is extended or adjusted under 35 U.S.C. 154(b) by 1036 days.

(21) Appl. No.: 09/936,855

(22) PCT Filed: Jan. 19, 2001

(86) PCT No.: PCT/JP01/00358

§ 371 (c)(1),
(2), (4) Date: Jan. 18, 2002

(87) PCT Pub. No.: WO01/54353

PCT Pub. Date: Jul. 26, 2001

(65) Prior Publication Data

US 2003/0012164 A1   Jan. 16, 2003

(30) Foreign Application Priority Data

Jan. 19, 2000   (JP)   ............................. 2000-014123

(51) Int. Cl.
*H04J 1/16* (2006.01)
*H04J 3/14* (2006.01)
*H04L 1/00* (2006.01)
*H04Q 7/24* (2006.01)

(52) U.S. Cl. .................................... 370/241; 370/338

(58) Field of Classification Search .................... None
See application file for complete search history.

(56) References Cited

U.S. PATENT DOCUMENTS 5,570,366 A * 10/1996 Baker et al. ................. 370/312
6,603,740 B1 * 8/2003 Du .............................. 370/248

FOREIGN PATENT DOCUMENTS

JP   8-335948   12/1996

* cited by examiner

*Primary Examiner*—Huy D. Vu
*Assistant Examiner*—Daniel Ryman
(74) *Attorney, Agent, or Firm*—Lerner, David, Littenberg, Krumholz & Mentlik, LLP

(57) ABSTRACT

A radio station and a data packet transmitting/receiving method for carrying out transmitting/receiving operations of data by radio. An identification packet generating section generates an identification packet having a data format in which a broadcast address is caused to be a destination address and a media access control address of a corresponding data station is caused to be a source address to send out a packet to a wireless network and to detect a loop to hold normal a communication state.

14 Claims, 5 Drawing Sheets

| PA | SFD | NID | WIRE DA | WIRE SA | L | TRASMIT DATA | PAD | FCS |

FIG.4A

| PA | SFD | NID | WIRELESS DA | WIRELESS SA | WIRE DA | WIRE SA | L | TRASMIT DATA | PAD | FCS |

FIG.4B

RADIO STATION AND DATA PACKET TRANSMITTING/RECEIVING METHOD

TECHNICAL FIELD

This invention relates to a radio station and a data packet transmitting/receiving method for carrying out transmitting/receiving operations of data by radio, and more particularly to a radio station and a data packet transmitting/receiving method which detect loop formed between wire networks in radio or wireless network caused to be of configuration in which plural wire networks are connected by radio to hold normal communication state.

BACKGROUND ART

In radio or wireless LAN (Local Area Network) internationally prescribed by IEEE (The Institute of Electrical Electronics Engineers, Inc.) 802.11, radio stations connected to wire network are distinguished in the state where specific functions are provided as access point.

Access points carry out management of plural other radio stations existing within the range where radio communication can be made (hereinafter referred to as service area) and plural communication terminal equipments connected to the access points themselves by wire. In this case, other radio stations are independent of management of plural access points. When management of the radio station is carried out by plural access points, there takes place inconvenience in communication by loop formation, etc. For this reason, in the radio or wireless LAN that the IEEE 802.11 prescribes, management of the radio station is carried out only by a certain one access point within the same service area. Namely, the data station is logically separated from other radio stations existing in the service area that other access points carry out management.

Access point can transmit communication data packet which has been caused to undergo transmission from communication terminal equipment connected to the access point itself by wire to other radio station that the access point itself carries out management. Alternatively, access point can transmit communication data packet which has been caused to undergo transmission from radio station that the access point itself carries out management to communication terminal equipment connected to the access point itself by wire.

In the radio LAN prescribed by IEEE 802.11, access points and radio stations caused to undergo management by the access points univocally correspond to each other. For this reason, in the radio LAN standardized by IEEE 802.11, in the case where one of communication terminal equipments connected to network that one access point carries out management carries out communication between the above-mentioned one access point and one of communication terminal equipments connected to network that other access point carries out management, access points are connected to each other by wire to thereby prevent occurrence of loop, etc. and to attain communication between mutual communication terminal equipments.

As described above, in the radio or wireless LAN standardized by the IEEE 802.11, in order that radio stations under control (management) of separate or different access points attain communication, it is necessary to connect access points to each other by wire.

However, in the case where there exist plural access points, it is troublesome work for user to connect these plural access points by wire. This problem can be solved by connecting access points to each other by radio. However, in the case where, e.g., one of communication terminal equipments connected to a certain access point is connected by wire to communication terminal equipment already connected to other access point, this network is connected by both wireless communication and wire communication. As a result, there is the possibility that communication data packet caused to undergo transmission on the network may form loop.

DISCLOSURE OF THE INVENTION

An object of this invention is to provide a radio station and a data packet transmitting/receiving method in which when plural wire networks are connected by radio to constitute radio (wireless) network, such an approach is employed to detect infinite loop in which communication data packet is infinitely circulated, thus making it possible to hold normal communicating state.

This invention proposed in order to attain such an object is directed to a radio station connected, by wire, to a first wire network composed of plural communication terminal equipments connected to each other by wire and connected, by radio, to a second wire network composed of plural communication terminal equipments connected to each other by wire and adapted for transmitting/receiving communication data packet, the radio station comprising an identification packet generating section for generating identification packet having a predetermined form of communication data packets, a wireless communication section for transmitting/receiving communication data packet between the wireless communication section and the second wire network, a wire communication section for transmitting/receiving communication data packet between the wire communication section and the first wire network, an identification packet detecting section for detecting identification packet generated at the identification packet generating section, and a control section for controlling the identification packet generating section to generate identification packet and for controlling the identification packet detecting section to detect identification packet.

Moreover, this invention is directed to a data packet transmitting/receiving method of transmitting/receiving communication data packet by radio between a first radio station connected to a first wire network composed of plural communication terminal equipments connected to each other by wire and a second radio station connected to a second wire network composed of plural communication terminal equipments connected to each other by wire, the data packet transmitting/receiving method comprising an identification packet generation step in which the first radio station generates identification packet having a predetermined form of communication data packets, a transmitting step in which the first radio station transmits identification packet generated at the identification packet generation step into the first wire network or to the second radio station, a discrimination step in which the first radio station discriminates whether or not communication data packet received from the second radio station or the first wire network is identification packet, and a step in which in the case where the communication data packet is the identification packet, the first radio station changes communication mode (form) between the first radio station and the second radio station.

Further, this invention is directed to a communication data packet transmitted/received by radio between a first radio station connected to a first wire network composed of plural communication terminal equipments connected to each other by wire and a second radio station connected to a second wire network composed of plural communication terminal equipments connected to each other by wire, the communication data packet including a destination address signal in which destination address indicating transmit destination indicates all communication terminal equipments connected to the first wire network and the second wire network, a wireless transmit source address signal indicating communication terminal equipment of transmit source when transmitting/receiving operations are carried out by radio, a wire destination address signal indicating communication terminal equipment of transmit destination of plural communication terminal equipments connected to the first wire network and the second wire network, and a wire transmit source address signal indicating communication terminal equipment of transmit source of plural communication terminal equipments connected to the first wire network and the second wire network, wherein the wire transmit source address signal is the same as the wire destination address signal.

Furthermore, this invention is directed to a radio (wireless) network system for transmitting/receiving communication data packet between a radio station connected to a first wire network composed of plural communication terminal equipments connected to each other by wire and a radio station connected to a second wire network composed of communication terminal equipments connected to each other by wire, the radio network system comprising an identification packet generating section in which the radio station generates identification packet which is communication data packet having a predetermined signal form, and an identification packet detecting section for detecting identification packet from the communication data packet.

In addition, this invention is directed to a radio network apparatus for carrying out, by radio, transmission of communication data packet between a first wire network and a second wire network, the radio network apparatus comprising a loop detection packet generating section which generates communication data packet of a predetermined form for detecting loop of the communication data packet, and a detecting section for detecting loop detection packet from received communication data packet.

Still more further objects of this invention and more practical merits obtained by this invention will become more apparent from the description which will be given below with reference to the attached drawings.

BRIEF DESCRIPTION OF THE DRAWINGS

FIGS. 4a and 4b are model views showing frame formats of communication data packet in wire network and wireless network, respectively.

BEST MODE FOR CARRYING OUT THE INVENTION

Explanation will now be given in detail with reference to the attached drawings in connection with a radio station, a data packet transmitting/receiving method, a communication data packet and a wireless network system according to this invention.

The wireless network system according to this invention is constituted with, e.g., a radio station connected to a wire network composed of plural communication terminal equipments connected to each other by Ethernet (Registered Trade Mark) and a radio station connected to other similar wire network. Namely, this wireless network system is wireless LAN (Local Area Network) for transmitting/receiving communication data packet by radio, and generates, at the radio station, identification packet (loop scan packet) having a predetermined signal form determined in advance to send out such packet, thus making it possible to detect loop between wire networks. In the case where the radio station receives identification packet circulated through the network and sent back, it changes, e.g., wireless communication channel used in transmitting/receiving operations of the communication data packet or cipher key, etc. in enciphering communication data packet to thereby cancel loop of the network.

While, in this invention, the case where one radio station carries out generation and detection of identification packet will be disclosed, since respective radio stations according to this invention primarily have functions equivalent to each other irrespective of wire network to which those radio stations are connected, there is no possibility that such radio stations are used in the state where these radio stations are distinguished in carrying out this invention.

Figure 1:
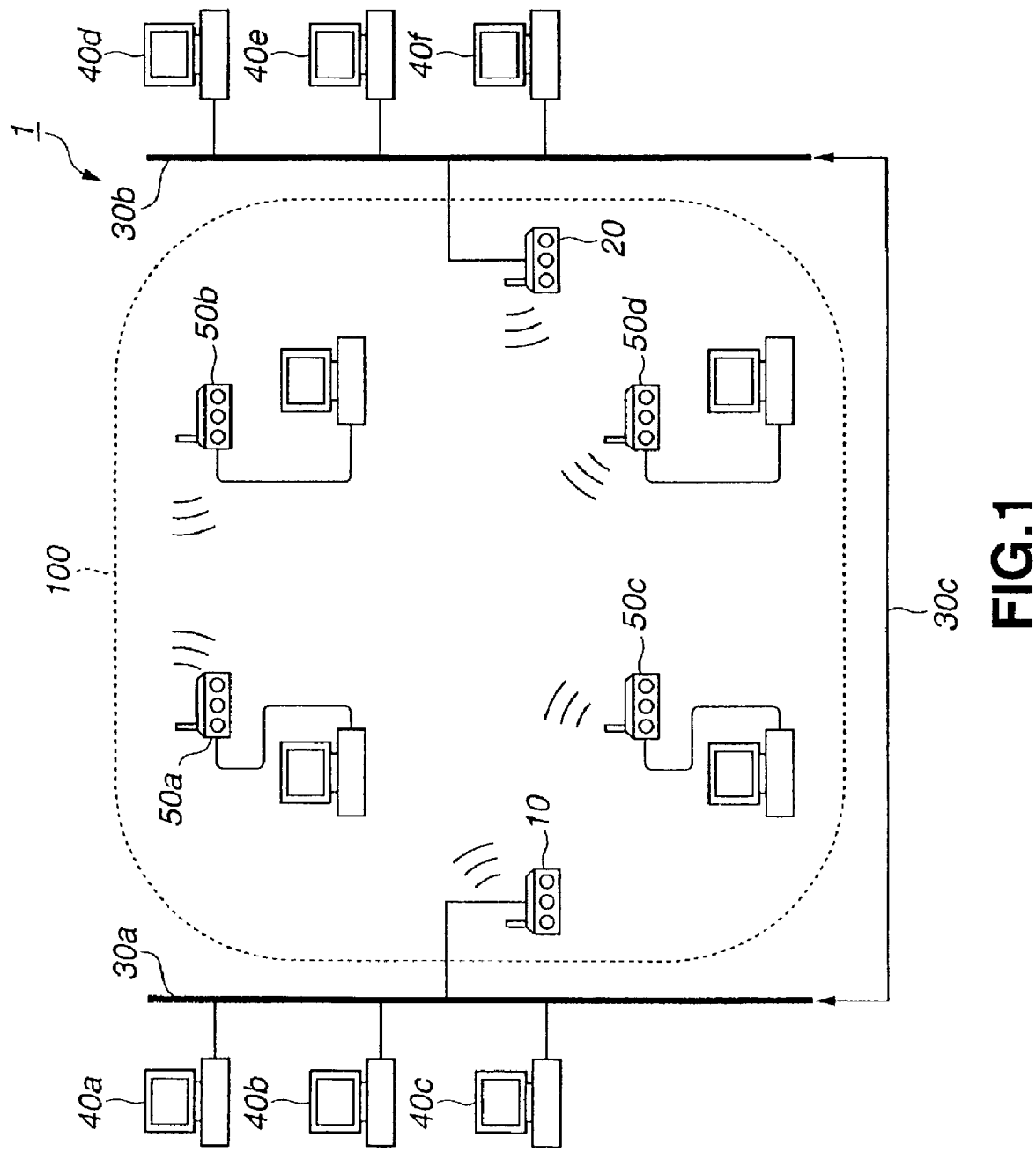
FIG. 1 is a view showing the configuration of a wireless network system to which a radio station according to this invention is applied.

The wireless network system 1 to which this invention is applied is shown in FIG. 1. The wireless network system 1 is a wireless network system composed of a radio station 10 and a radio station 20 which are connected to respective wire networks, and radio stations 50a to 50d to which communication terminal equipments are respectively connected as single body, and adapted for transmitting/receiving communication data packets by radio between these radio or wireless stations. The wireless network system 1 will be explained as network in conformity with the Ethernet standard prescribed by IEEE (The Institute of Electrical and Electronics Engineers, Inc.) in this specification.

In the wireless network system 1, the radio station 10 is connected to a wire network composed of communication terminal equipments 40a to 40c through a transmission path 30a where communication data caused to be of packet structure are subjected to transmission. The radio station 20 is also connected to a wire network composed of communication terminal equipments 40d to 40f through a transmission path 30b in a manner similar to the radio station 10.

In this example, the communication terminal equipments 40a to 40d indicate, e.g., data processing unit such as personal computer or printer, etc. It is to be noted that communication terminal equipments connected to radio stations 50a, 50b, 50c and 50d may be caused to be of configuration having, in advance, function corresponding to the radio station according to this invention.

The transmission paths 30a and 30b are, e.g., wire LAN cable in conformity with 10BASE5. In more practical sense, such transmission paths serve to carry out transmission of communication data packet of frame format in conformity with CSMA/CD (Carrier Sense Multiplex Access/Collision Detection)type LAN prescribed by IEEE 802.3.

Figure 2:
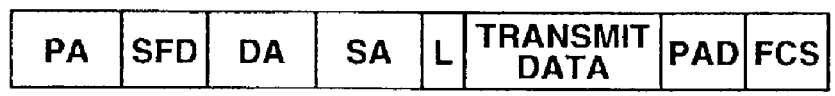
FIG. 2 is a model view showing frame structure of communication data packet caused to undergo transmission through wire LAN cable in conformity with 10BASE5.

As shown in FIG. 2, frame format of communication data packet in wire LAN cable consists of PA (Preamble) used for establishing synchronization, SFD (Start Frame Delimiter), DA (Destination Address), SA (Source Address), L (Length) indicating length of transmit data, transmit data, PAD for adjusting frame length added when data does not reach minimum frame length, and FCS (Frame Check Sequence) for detecting error of frame.

Within the communicatable range (hereinafter referred to as service area) 100 indicated by dotted lines in FIG. 1, since the radio station 10, the radio station 20 and the radio stations 50a to 50d have communication forms similar to each other, they can communicate by radio. The communication forms similar to each other mean that respective radio stations have wireless communication channels similar to each other, and mean that they have the same cipher key in enciphering communication data packet.

Figure 3:
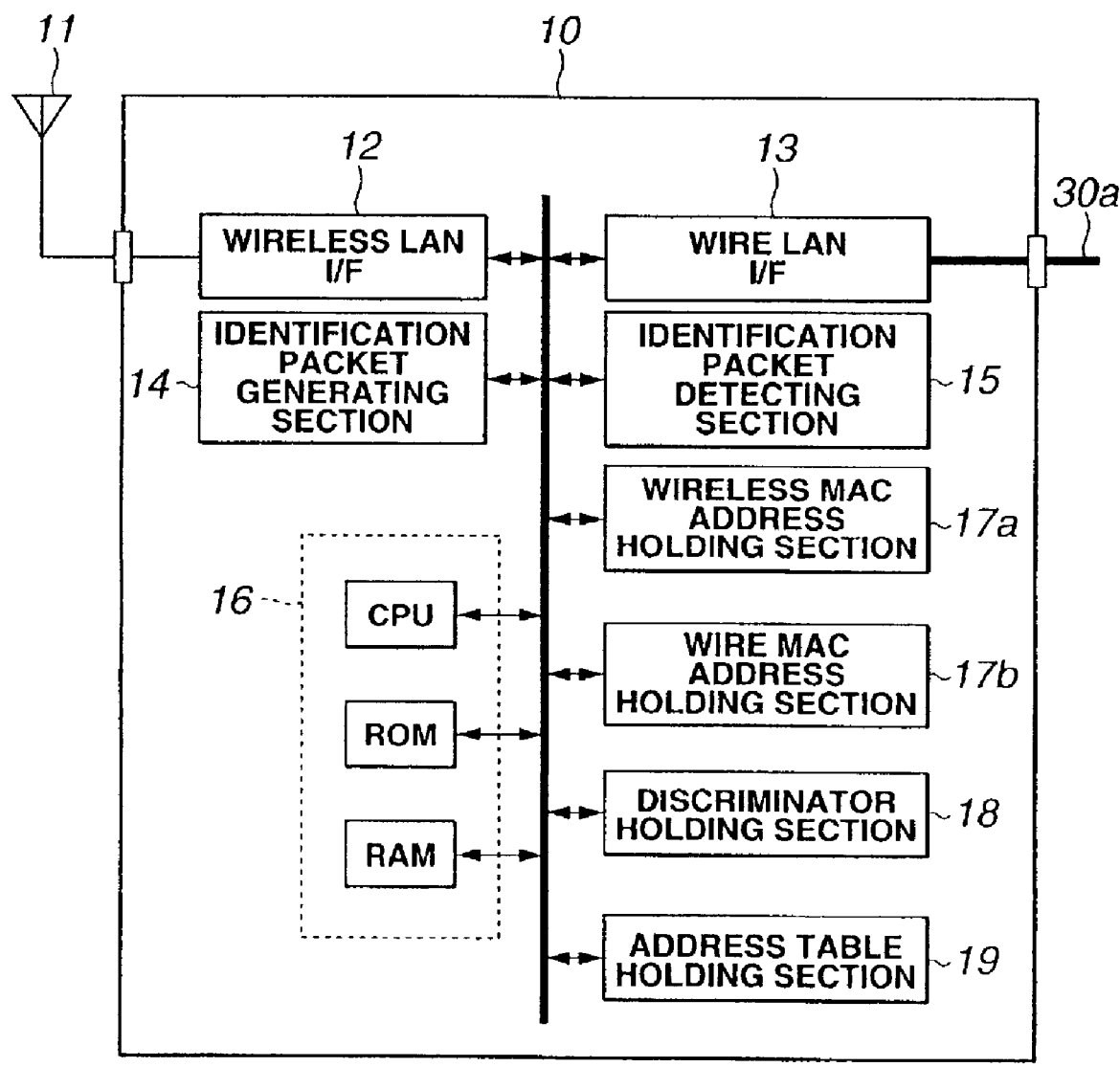
FIG. 3 is a block diagram showing the radio station according to this invention.

The radio station 10, the radio station 20 and the radio stations 50a to 50d have respective sections which will be described with reference to, e.g., FIG. 3. While respective radio stations are distinguished by labelling radio station 10, radio station 20, radio station 50a . . . for convenience as described above, since such radio stations primarily have functions equivalent to each other, there is no possibility that they are used in a distinguished manner. The configuration of the radio station will now be described by using the radio station 10.

The radio station 10 comprises a wireless LAN interface section (hereinafter referred to as wireless LAN I/F) 12 for carrying out wireless communication between respective radio stations through an antenna 11, a wire LAN interface section (hereinafter referred to as a wire LAN I/F) 13 connected to the transmission path 30a and adapted for carrying out transmission of data onto the transmission path 30a, an identification packet generating section 14 for generating identification packet having a predetermined signal form determined in advance, an identification packet detecting section 15 for discriminating whether or not received communication data packet is identification packet, and a control circuit 16 including CPU for governing the above-mentioned sections, ROM in which various programs, etc. executed by the CPU are stored, and RAM used as work area of the CPU, etc.

In the radio station 10 constituted as described above, the wireless LAN I/F 12 not only carries out transmitting/receiving operations of communication data packet between the radio station 10 and the radio station 20 and the radio stations 50a to 50d, but also sends out identification packet generated at the identification packet generating section 14 to the wireless network. The wire LAN I/F 13 transmits/receives communication data packet between the wire LAN I/F 13 and communication terminal equipments 40a to 40c through the transmission path 30a. The identification packet generating section 14 generates identification packet for loop detection. While the detail of the identification packet will be described later, it has data format in which broadcast address is caused to be destination address and MAC (Media Access Control) address of the radio station 10 itself is caused to be transmit source address. The identification packet detecting circuit 15 discriminates whether or not communication data packet delivered from the wire LAN I/F 13 is identification packet.

The radio station 10 constituted by respective components as described above can carry out transmission of communication data packet to each other through the transmission path 30a between the radio station 10 and respective communication terminal equipments 40a to 40c connected by wire to the radio station 10 itself. Moreover, the radio station 10 can carry out transmission of communication data packet to each other by radio between the radio station 10 and the radio station 20 and radio stations 50a to 50d. For example, when the communication terminal equipment 40a transmits communication data packet to the communication terminal equipment 40f, comniunication data packet sent out from the communication terminal equipment 40a is transmitted to the radio station 10 through the transmission path 30a, and is transmitted from the radio station 10 to the radio station 20 through the wireless network. Finally, such communication data packet is delivered from the radio station 20 to the communication terminal equipment 40f through the transmission path 30b.

Explanation will now be given in connection with frame format of communication data packet in the wire network and wireless network. Frame format of communication data packet in the wire network is shown in FIG. 4a and frame format of communication data packet in the wireless network is shown in FIG. 4b.

The frame format shown in FIG. 4a indicates the frame format in conformity with CSMA/CD (Carrier Sense Multiplex Access/Collision Detection) type LAN prescribed by IEEE 802.3 which has been explained with reference to FIG. 2. The destination address DA shown in FIG. 2 is indicated as wire destination address DA in FIG. 4 and the (transmit) source address SA is indicated as wire (transmit) source address SA in FIG. 4. In this case, NID indicates network ID, which is identifier (ID) for permitting communication between radio stations. Accordingly, in respective radio stations, communication data packets of which network IDs are different cannot caused to undergo transmitting/receiving operations to each other.

When transmission of communication data packet is carried out by radio, wireless destination address DA indicating destination address in the wireless network and wireless (transmit) source address SA indicating (transmit) source address in the wireless network are added to the forward portion of the wire destination address DA and the wire (transmit) source address SA prescribed by frame format in the wire network as shown in FIG. 4b.

Accordingly, in the case where the communication terminal equipment 40a transmits communication data packet to the communication terminal equipment 40f, this communication data packet is caused to be of structure in which the wire destination address DA is MAC address of the communication terminal equipment 40f and the wire (transmit) source address SA is MAC address of the communication terminal equipment 40a. In addition, the wireless destination address DA is caused to be MAC address of the radio station 20 and the wireless (transmit) source address SA is caused to be MAC address of the radio station 10.

The radio station 10 comprises respective components for storing the above-described MAC addresses. Namely, the radio station 10 comprises, as shown in FIG. 3, a wireless MAC address holding section 17a for holding wireless destination address DA and wireless (transmit) source address SA for transmission and reception by radio, and a wire MAC address holding section 17b for holding wire destination address DA and wire (transmit) source address SA for transmission and reception by wire. Further, the radio station 10 comprises an identifier holding section 18 for holding network ID, and an address table holding section 19 for holding, as address table, correspondence between addresses of respective communication terminal equipments and addresses of the radio stations.

When the radio station 10 receives communication data packet through the wireless network and the transmission path 30*a*, it learns, on the basis of MAC address described in the received communication data packet, MAC addresses of the radio station 10 itself and the radio station constituting the wireless network and MAC address of the communication terminal equipment of the wire network connected to the radio station 10 itself to store them into the address table holding section 19.

In the case where the wire network is complicatedly constituted, there are instances where communication terminal equipments connected to separate or different wire networks are spatially mixed with each other. For this reason, a situation may occur where which communication terminal equipments are components of the same wire network cannot be recognized. At this time, there are cases where respective wire networks are connected to each other so that loop is formed by one portion of the network.

Let consider the case where, e.g., the transmission path 30*a* and the transmission path 30*b* are connected by transmission path 30*c* in the wireless network system 1. At this time, communication data packet sent out by radio from the radio station 10 is transmitted to respective communication terminal equipments connected to the radio stations 50*a* to 50*d* and is transmitted to the radio station 20. The communication data packet thus transmitted is delivered (distributed) to communication terminal equipments 40*d* to 40*f*. Particularly, in the case where destination address of communication data packet is broadcast address, the communication data packet is transmitted to the communication terminal equipment 40*c* through the transmission path 30*c*, and is transmitted to the radio station 10. Further, when communication data packet is sent out by radio for a second time from the radio station 10, it infinitely circulates within this wireless network system.

In the wireless network system 1 according to this invention, in order to detect loop of such a network, communication data packet having a predetermined signal form, i.e., identification packet is caused to circulate within the network. In the identification packet generated at the identification packet generating section 14, particularly the wireless destination address DA is caused to be broadcast address and all of the wireless (transmit) source address SA, wire destination address DA and wire (transmit) source address SA are caused to be addresses of the radio station 10. Accordingly, in the case where loop is formed at a portion of the network, the identification packet returns to the radio station 10 which is transmit source.

Figure 5:
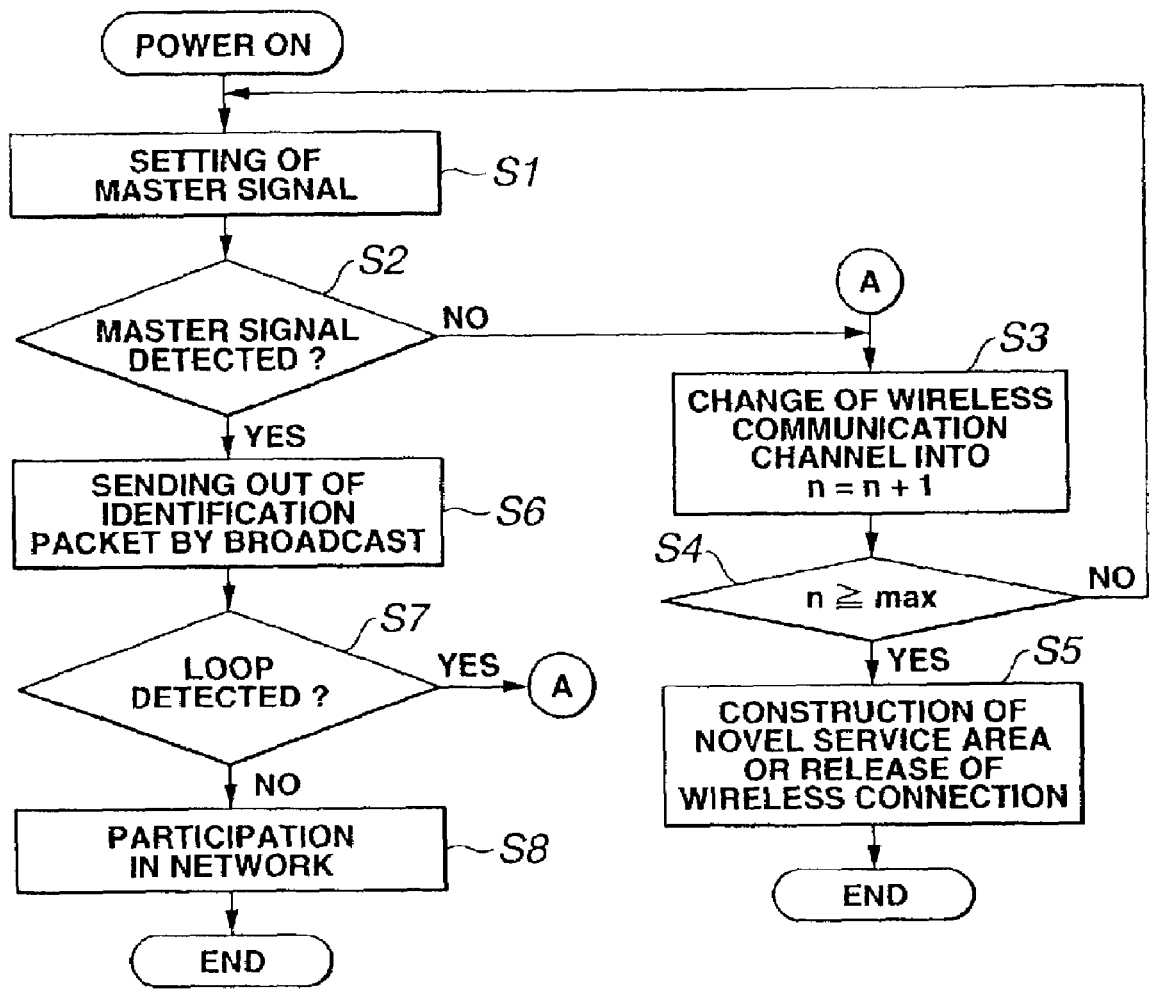
FIG. 5 is a flowchart showing processing in which wireless network system constituted with the radio station according to this invention detects loop at the time when power is turned ON and at the time of starting from sleep.

Processing when wireless network system 1 constituted by the radio station as described above detects loop will be described with reference to FIGS. 5 and 6. While the radio station 10 and the radio station 20 primarily have functions equivalent to each other and therefore they are not used in a distinguished manner, operations of respective components in the radio station 10 will now be indicated. Processing in the case where the radio station 10 generates identification packet to transmit it to the wireless network is shown in FIG. 5.

The identification packet generating section 14 in the radio station 10 generates identification packet. At this time, the identification packet generating section 14 generates identification packet in the state where wireless destination address DA is caused to be broadcast address, and wireless (transmit) source address SA, wire destination address DA and wire (transmit) source address are caused to be MAC addresses of the radio station 10. The identification packet generating section 14 delivers the identification packet thus generated to wireless LAN I/F 12. In the wireless LAN I/F 12, the identification packet is rewritten into wireless frame format. The wire LAN I/F 12 sends out, by broadcast, the identification packet sent from the identification packet generating section 14 to the wireless network.

Processing that the radio station 10 detects loop is now indicated. Initially, detecting operation of loop executed when power of the radio station 10 is turned ON and at the time of starting from sleep is shown in FIG. 5.

When power is turned ON, the radio station 10 sets master signal of service area where the radio station 10 itself should participate at step S1. The area where the radio station 10 itself participates indicated as service area range 100 indicated by dotted lines in FIG. 1, and the master signal indicates a signal transmitted from the radio station which carries out management of area. The master signal is, e.g., a becon signal, and network ID is included in the master signal. In addition, the network ID is identifier (ID) for specifying the wireless network, and radio stations which can communicate with each other have the same network ID.

Subsequently, the radio station 10 attempts detection of master signal of the service area 100 at step S2. The radio station 10 first attempts detection of master signal at wireless communication channel n. In the case where the master signal is not detected, e.g., the wireless communication channel is changed into n+1 (step S3) to attempt detection of master signal for a second time at the wireless communication channel n+1. In the case where the master signal is not detected, the radio station 10 changes wireless communication channel until there results maximum value of frequency band of wireless communication channel to attempt detection of master signal every corresponding channel (step S4). In the case where even if the frequency band of the wireless communication channel is entirely retrieved, no master signal is detected, the radio station 10 itself is caused to serve as master equipment to stand by to constitute novel network.

On the other hand, in the case where the master signal is detected at the processing of the step S2, processing by the radio station 10 shifts to step S6 to send out identification packet to the wireless network constituted by the radio station 20 and the radio stations 50*a* to 50*d* by broadcast.

With respect to the identification packet, in the above-described communication data packet shown in FIG. 4*b*, the wireless destination address DA is caused to be broadcast address, and the wireless (transmit) source address SA, the wire destination address DA and the wire (transmit) source address SA are caused to be addresses of the radio station 10. Accordingly, this identification packet is delivered (distributed) to the radio station 20 and the radio stations 50*a* to 50*d*, and is also delivered (distributed) to the communication terminal equipments 40*a* to 40*c* connected by wire to the radio station 10.

Reception of communication data packet sent out to the wireless network through the wire network means that the wire network to which the radio station 10 is connected and the wire network to which the radio station 20 is connected are connected to form loop.

Accordingly, in the case where the radio station 10 detects identification packet through the wire network at step S7, this wireless network system 1 forms loop anywhere. In the case where the radio station 10 detects loop, it is away from wireless communication channel used to detect as to whether or not there exists master signal having the same network ID as that of the radio station 10 at another wireless communication channel. Namely, a series of steps from the step S3 are repeated. In the case where the radio station 10 detects master signal having the same network ID, it sends out identification packet for loop detection to the detected wireless network at step S6.

In the case where the radio station 10 does not detect loop at step S7, it participates in the network in which master signal having this network ID is shared (step S8).

On the other hand, in the case where the radio station 10 does not detect master signal having the same network ID as that of the radio station 10 itself, the radio station 10 itself is caused to serve as area master to construct novel service area under this wireless communication channel. The radio station 10 transmits master signal including network ID of the radio station 10 itself. Moreover, in the case where master signal having the same network ID as that of the radio station 10 itself is not detected and there is no wireless communication channel to be newly constructed, the radio station 10 releases wireless connection (step S5).

Further, the radio station 10 periodically executes loop detection also except for the time when power is turned ON. This is because attempt is made to detect the configuration change, etc. followed by movement of the radio station in which ON/OFF of power is not included or change of link signal, etc. when the wire LAN is particularly 10BASE-T. Processing when the radio station 10 periodically carries out loop detection is shown in FIG. 6. In this case, it is assumed that the radio station 10 executes loop detection processing at a frequency of about several minutes interval.

The radio station 10 sends out identification packet to the radio station 20 and the radio stations 50a to 50d by broadcast at step S11.

In the case where the radio station 10 detects loop at step S12, it is away from the wireless communication channel used to detect as to whether or not there is master signal having the same network ID as that of the radio station 10 itself at another wireless communication channel (step S13). The radio station 10 changes, e.g., wireless communication channel into n+1 (step S14) to attempt detection of master signal for a second time at the wireless communication channel n+1. In the case where no master signal is detected, the radio station 10 changes wireless communication channel until corresponding frequency band reaches the maximum value of the frequency band of the wireless communication channel (step S15) to attempt detection of master signal every corresponding channel.

In the case where even if the radio station 10 entirely retrieves frequency band of wireless communication channel, no master signal is detected, the radio station 10 itself is caused to serve as area master to construct novel service area under this wireless communication channel. The radio station 10 transmits network ID of the radio station 10 itself in a manner included in master signal. In addition, in the case where master signal having the same network ID is not detected and there is no wireless communication channel to be newly constructed, the radio station 10 releases wireless connection (step S16).

On the other hand, in the case where master signal is detected at the step S12, the radio station 10 repeats processing of the step S11 to send out, by broadcast, identification packet to the wireless network constituted by the radio station 20 and the radio stations 50a to 50d. In the case where loop is not detected at the step S12, the radio station 10 continues participation into the network where master signal having this network ID is shared (step S17).

Figure 6:
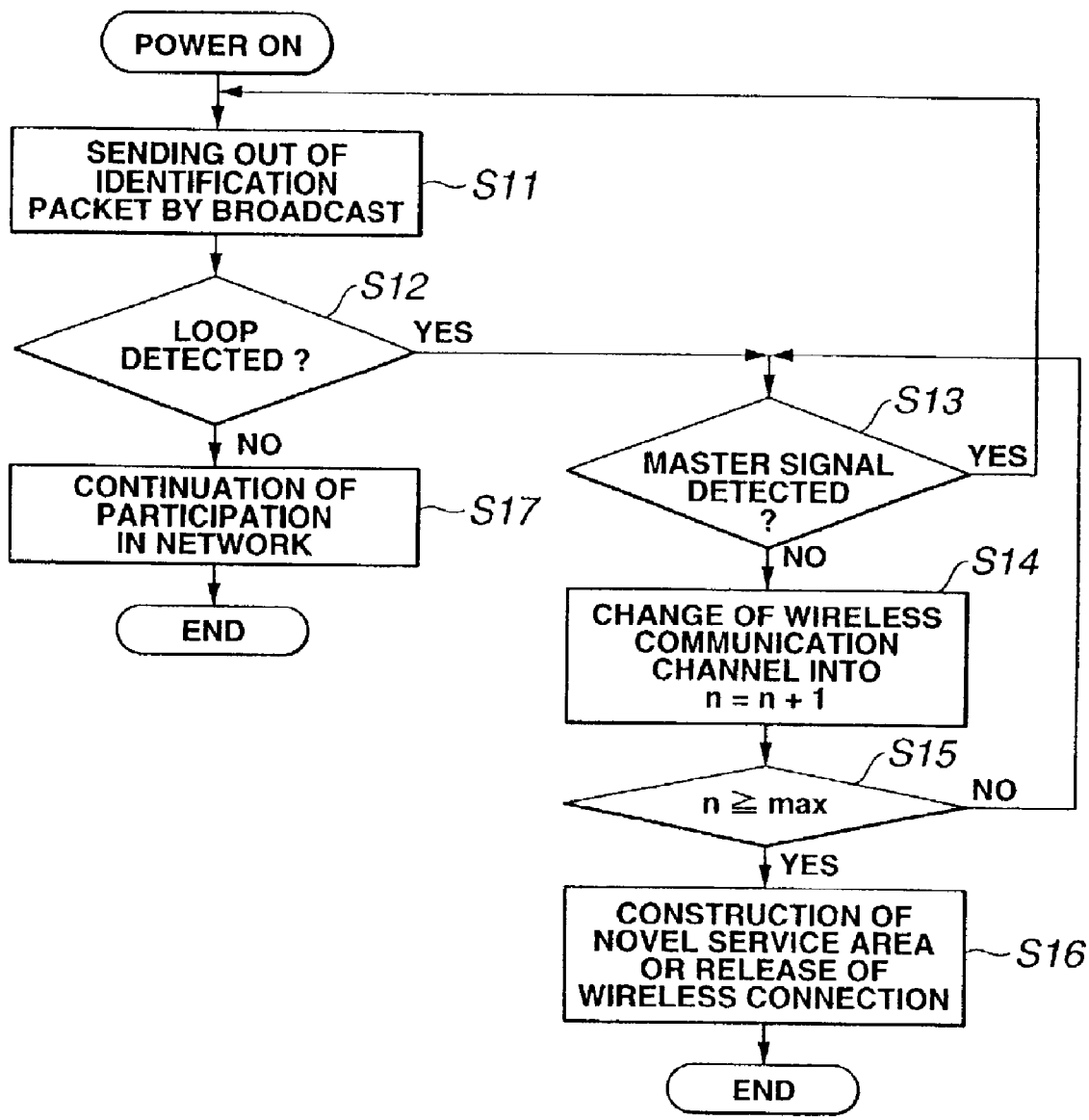
FIG. 6 is a flowchart showing processing in which wireless network system constituted with the radio station according to this invention periodically detects loop.

As explained above, the wireless network system 1 according to this invention detects, by the processing shown in FIGS. 5 and 6, that the wireless network system 1 forms loop between the wire network where the radio station 10 is connected by wire and the wire network where the radio station 20 is connected by wire to change network ID which permits wireless communication between the radio station 10 and the radio station 20 to thereby change wireless communication channel to change communicating state between the radio station 10 and the radio station 20. As a result, infinite loop in which communication data packet infinitely circulates within the wireless network system 1 is canceled (eliminated). At this time, wireless communication between the radio station 10 and the radio station 20 is released and connection is made only by the transmission path 30c. However, since there does not result the fact that communication between networks is interrupted, normal communicating state is held.

While it has been explained in this invention that, at the step S6 of the loop detection processing which has been explained with reference to FIG. 5, identification packet is first broadcast to the wireless network constituted by the radio station 20 and the radio stations 50a to 50d, this invention is not limited to such an implementation. Even if the radio station 10 first sends out identification packet to the wire network, it is possible to detect loop of the wireless network system 1. In this case, when the radio station 10 receives identification packet through the wire network, loop is formed.

At this time, the radio station 10 allows wire destination address DA and wire (transmit) source address SA of the identification packet to be MAC address of the radio station 10 itself similarly to the case where the identification packet is first sent out to the wireless network.

For example, in the case where the transmission path 30a and the transmission path 30b are connected by the transmission path 30c so that loop is formed, identification packet which has been sent out from the radio station 10 to the wire network is transmitted to the radio station 20 through the transmission path 30c and the transmission path 30b. Since wire destination address DA of this identification packet is address of the radio station 10, the radio station 20 adds wireless destination address DA of this identification packet as MAC address of the radio station 10 to transmit it by radio. In the case where the radio station 10 receives this identification packet from the radio station 20, loop is detected to cancel loop by the processing shown in FIGS. 5 and 6.

Also in the above-described case, it is possible to detect loop between wire networks. Thus, similar merits where normal communicating state is held can be obtained.

It is to be noted that, as described above, the radio station 10, the radio station 20 and the radio stations 50a to 50d can be used in a manner such that they are not distinguished. Namely, even if either the radio station 20 carries out processing as described above in the radio station 10, or respective radio stations carry out the above-described processing, similar merits can be obtained.

In addition, while, in this invention, explanation has been given in connection with the case where the radio station changes wireless communication channel when the radio station detects loop as shown in FIG. 5 to thereby cancel loop of the network, even if cipher key at the time of enciphering communication data packet is changed in addition to change of the wireless communication channel, it is possible to cancel loop of the network. Also in this case, similar merits to detect loop between wire networks so that normal communicating state is held can be obtained.

INDUSTRIAL APPLICABILITY

In this invention, in the case where respective portions of the first wire network and the second wire network are connected so that loop is formed, such an approach is employed to detect that loop is formed to change communicating mode (form) of wireless communication between radio stations, thus making it possible to cancel infinite loop that communication data packet infinitely circulates within the infinite network system. At this time, although it is maintained that loop portion between wire networks is continued to be connected, since wireless communication between radio stations is released, normal communicating state is held.

The invention claimed is:

1. A radio station connectable by wire to a first wire network including a first plurality of pieces of communication terminal equipment connected by wire and connectable by radio to a second wire network including a second plurality of pieces of communication terminal equipment connected by wire and adapted for transmitting and receiving a plurality of communication data packets, the radio station comprising:
   - identification packet generating means for generating an identification packet having a predetermined form;
   - wireless communication means for transmitting and receiving the plurality of communication data packets between the wireless communication means and the second wire network;
   - wire communication means for transmitting and receiving the plurality of communication data packets between the wire communication means and the first wire network;
   - identification packet detecting means for detecting the identification packet generated by the identification packet generating means; and
   - control means for controlling the identification packet generating means to generate the identification packet and for controlling the identification packet detecting means to detect the identification packet,
   - wherein the identification packet includes a wire destination address portion indicating a destination, a wire transmit source address portion indicating a wire transmit source of the identification data packet, and a wireless transmit source address portion indicating a wireless transmit source of the identification data packet, and
   - wherein each of the wire destination address portion, the wire transmit source address portion, and the wireless transmit source address portion of the identification packet indicates the radio station.

2. The radio station as set forth in claim 1, wherein the control means changes a communication mode in the wireless communication means when the identification packet is detected by the identification packet detecting means.

3. The radio station as set forth in claim 2, further comprising selector means for selecting a wireless communication channel for transmitting and receiving the plurality of communication data packets from a plurality of wireless communication channels,
   - wherein the control means selects a wireless communication channel at the selector means to change the communication mode.

4. The radio station as set forth in claim 2, further comprising ciphering means for enciphering each of the plurality of communication data packets transmitted and received by radio between the ciphering means and the second wire network based on a cipher key,
   - wherein the control means changes the cipher key at the ciphering means to change the communication mode.

5. The radio station as set forth in claim 1, wherein each of the plurality of communication data packets includes a wire destination address portion indicating one piece of communication terminal equipment of the first and the second pluralities of pieces of communication terminal equipment serving as a destination of the communication data packet and a wire transmit source address portion indicating one piece of communication terminal equipment of the first and second pluralities of pieces of communication terminal equipment serving as a transmit source of the communication data packet.

6. The radio station as set forth in claim 1, further comprising wireless address adding means for adding a respective wireless destination address portion indicating a destination when transmitting and receiving operations are performed by radio and a respective wireless transmit source address portion indicating a transmit source when the transmitting and the receiving operations are performed by radio to each of the plurality of communication data packets sent from the wireless communication means to the second wire network.

7. The radio station as set forth in claim 6, wherein the wireless destination address portion of the identification packet includes broadcast addresses in which each of the plurality of pieces of communication terminal equipment connected to the radio station and each of the plurality of pieces of communication terminal equipment connected to the wire network are the destination.

8. A data packet transmitting and receiving method of transmitting and receiving a plurality of communication data packets by radio between a first radio station connected to a first wire network including a first plurality of pieces of communication terminal equipment connected by wire and a second radio station connected to a second wire network including a second plurality of communication terminal equipment connected by wire, the method comprising the steps of:
   - generating an identification packet, the generation performed by the first radio station and the identification packet having a predetermined form;
   - transmitting the identification packet generated in the identification packet generation step to one of the first wire network and the second radio station, the transmission performed by the first radio station;
   - determining whether a communication data packet received from one of the second radio station or the first wire network is the identification packet, the determination performed by the first radio station; and
   - changing a communication mode between the first radio station and the second radio station when the communication data packet is the identification packet,
   - wherein the identification packet includes a wire destination address portion indicating a destination, a wire transmit source address portion indicating a wire transmit source of the identification data packet, and a wireless transmit source address portion indicating a wireless transmit source of the identification data packet, and
   - wherein each of the wire destination address portion, the wire transmit source address portion, and the wireless transmit source address portion of the identification packet indicates the first radio station.

9. The data packet transmitting and receiving method as set forth in claim 8, further comprising the step of selecting a wireless communication channel for transmission of the communication data packet from a plurality of wireless communication channels to change the communication mode based on the wireless communication channel selected in the selection step.

10. The data packet transmitting and receiving method as set forth in claim 8, further comprising the step of enciphering the communication data packet based on a cipher key to change the communication mode based on the cipher key used in the ciphering step.

11. A wireless network system of transmitting and receiving a plurality of communication data packets between a first radio station connected to a first wire network including a first plurality of pieces of communication terminal equipment connected by wire and a second radio station connected to a second wire network including a second plurality of pieces of communication terminal equipment connected by wire, wherein one or both of the first radio station and/or the second radio station comprises: identification packet generating means for generating an identification packet that is a communication data packet having a predetermined signal form; and identification packet detecting means for detecting the identification packet from the plurality of communication data packets; wherein the identification packet includes a wire destination address portion indicating a destination, a wire transmit source address portion indicating a wire transmit source of the identification data packet, and a wireless transmit source address portion indicating a wireless transmit source of the identification data packet; and wherein each of the wire destination address portion, the wire transmit source address portion, and the wireless transmit source address portion of the identification packet indicates the first radio station if the identification packet generating means of the first radio station generates the identification packet or indicates the second radio station if the identification packet generating means of the second radio station generates the identification packet.

12. The wireless network system as set forth in claim 11, wherein a communication mode between the first radio station and the second radio station is changed based on a detection result of the identification packet detecting means.

13. A wireless network apparatus for performing transmission of a plurality of communication data packets between a first wire network and a second wire network by radio, the wireless network apparatus comprising:
  loop detection packet generating means for generating a loop detection packet of a predetermined form used for detecting a loop of one or more of the communication data packets; and
  detecting means for detecting the loop detection packet from a plurality of received communication data packets,
  wherein the loop detection packet includes a wire destination address portion indicating a destination, a wire transmit source address portion indicating a wire transmit source of the identification data packet, and a wireless transmit source address portion indicating a wireless transmit source of the identification data packet, and
  wherein each of the wire destination address portion, the wire transmit source address portion, and the wireless transmit source address portion of the loop detection packet indicates the same address.

14. The wireless network apparatus as set forth in claim 13, wherein a communication mode is changed based on a detection result of the detecting means.

\* \* \* \* \*